(12) United States Patent
Muderick

(10) Patent No.: US 7,618,349 B1
(45) Date of Patent: Nov. 17, 2009

(54) THERAPEUTIC PUTTY WITH INCREASING OR DECREASING STIFFNESS

(75) Inventor: Aaron Muderick, 125 Conway Ave., Narberth, PA (US) 19072

(73) Assignee: Aaron Muderick, Narberth, PA (US)

(*) Notice: Subject to any disclaimer, the term of this patent is extended or adjusted under 35 U.S.C. 154(b) by 363 days.

(21) Appl. No.: 11/564,585

(22) Filed: Nov. 29, 2006

Related U.S. Application Data

(60) Provisional application No. 60/742,121, filed on Feb. 2, 2006.

(51) Int. Cl.
A63B 23/14 (2006.01)
A63B 23/16 (2006.01)

(52) U.S. Cl. ............................................. 482/44

(58) Field of Classification Search ............... 482/44, 482/49, 92, 148; A63B 23/14
See application file for complete search history.

(56) References Cited

U.S. PATENT DOCUMENTS

| | | |
|---|---|---|
| 2,541,851 A | 2/1951 | Wright |
| 2,644,805 A | 7/1953 | Martin |
| 2,852,484 A | 9/1958 | New |
| 3,677,997 A | 7/1972 | Kaiser et al. |
| 3,855,171 A | 12/1974 | Wegehaupt et al. |
| 3,862,919 A | 1/1975 | Nitzsche et al. |
| 4,011,197 A | 3/1977 | Lee |
| 4,026,844 A | 5/1977 | Kittle et al. |
| 4,208,316 A | 6/1980 | Nauroth et al. |
| 4,273,589 A | 6/1981 | Nauroth et al. |
| 4,308,074 A | 12/1981 | Nauroth et al. |
| 4,463,108 A | 7/1984 | Wagner et al. |
| 5,028,653 A | 7/1991 | Desmonceau et al. |
| 5,039,771 A | 8/1991 | Morimoto et al. |
| 5,094,238 A | 3/1992 | Gibbon |
| 5,319,021 A | 6/1994 | Christy |
| 5,446,075 A | 8/1995 | Gibbon |
| 5,693,689 A | 12/1997 | Gibbon |
| 2006/0093726 A1* | 5/2006 | Bachmeier et al. .......... 426/615 |

* cited by examiner

Primary Examiner—Loan H Thanh
Assistant Examiner—Oren Ginsberg

(57) ABSTRACT

A method of exercise or manipulative therapy is disclosed. The method includes obtaining a first mass of putty, introducing an additive to the first mass of putty, and physically manipulating the first mass with the additive in order to create a combined mass. The combined mass exhibits a noticeable change in stiffness relative to the first mass, yet retains substantially the same weight and color of the first mass. Additionally disclosed is a kit for providing manipulative therapy of varying difficulty to a user. The kit includes a first mass of putty and an additive, which is initially separate from the first mass. If the additive is combined with the first mass, a combined mass is created. The combined mass exhibits a noticeable change in stiffness relative to the first mass, yet retains substantially the same weight and color of the first mass.

15 Claims, 2 Drawing Sheets

THERAPEUTIC PUTTY WITH INCREASING OR DECREASING STIFFNESS

BACKGROUND OF THE INVENTION

This invention relates in general to therapeutic exercise putties and more particularly to an exercise putty kit and related methods, whereby a user can increase or decrease the level of stiffness in exercise putty without affecting the physical texture, release or color of the exercise putty.

Borosiloxanes are a class of compounds which are chain-extending reaction products of polysiloxanes and boron containing compounds such as trimethyl boroxane, pyroboric acid, boric anhydride, ethyl borate, esters of boric acid and others. Their formulation is well known, and is described in U.S. Pat. No. 2,541,851 (Wright). Borosiloxanes exhibit a resistance to deforming force which is proportional to the force applied to them. In the vernacular they are often called "bouncing putties." This resistant property makes them useful as an exercise putty for use in exercise or physical therapy, where development of enhanced dexterity, range of motion, and/or strength of the hands is desired.

A variety of exercise putties exist in the marketplace. They are available in a pre-determined hardness or offer the ability to harden the putty by integrating it with a secondary borosiloxane or polyorganosiloxane mass of a much higher stiffness. There are four problems known to the inventor regarding existing systems.

First, users have been unable to increase the stiffness of a primary mass of putty without dramatically altering the total weight of the primary mass. Significant alteration in the weight of the primary mass changes the way in which the primary mass is gripped by the hand and can negatively impact the effect of the therapeutic regimen, mask improvements in muscle strength, or provide additional stress to tendons, ligaments and other structural elements of the hand.

Second, because existing secondary masses achieve their hardening effect by averaging their own hardness with the hardness of the primary mass, there is a limit to the maximum hardness which can be achieved. The secondary mass may need to be so hard that the user is unable to integrate it into the primary mass without significant fatigue. If the user has sustained an injury for which the use of this product is proscribed, attempting to integrate an extremely hard secondary mass increases the chances of further injury during the integration process.

Third, because the secondary masses of previous inventions comprise a significant percentage by weight of the combined mass, the addition of a secondary mass will dramatically alter the color and potentially the texture and release properties of the primary mass. Following this, it is infeasible for manufacturers to market their exercise putties based on color or visual appearance due to the impracticality of stocking a wide variety of colors and corresponding wide variety of color-matched hardener and softener. This prevents the user from selecting exercise putty based on color, or other aesthetic criteria, which offers an additional psychological benefit to the therapeutic exercise regimen.

Fourth, users have been unable to soften a primary mass of putty after it has been hardened and determined that the primary mass is now too stiff for a successful therapeutic exercise regimen without dramatically altering the total weight of the primary mass or negatively affecting its color or physical properties.

It is therefore desired to provide an exercise putty kit and related methods whereby a user may introduce an additive to a primary mass of putty, resulting in a combined mass. The additive may be a hardening agent or a softening agent. If a hardening agent is introduced, the combined mass would be of noticeably increased stiffness relative to the original primary mass, yet the combined mass would be substantially unaltered relative to the original primary mass in terms of total weight, color, appearance, release or other characteristics. Alternatively, if a softening agent is introduced, the combined mass would be of noticeably decreased stiffness relative to the original primary mass, yet the combined mass would be substantially unaltered relative to the original primary mass in terms of total weight, color, appearance, release or other characteristics. Further introduction of additive to an already combined mass should noticeably alter the stiffness of the combined mass, again without substantially altering its total weight, color, appearance, release or other characteristics. Accordingly, a user would be able to noticeably soften a primary mass or previously hardened mass without substantially altering other characteristics of the combined mass. Likewise, a user would be able to noticeably harden a primary mass or previously softened mass without substantially altering other characteristics of the combined mass.

It is further desired to provide an exercise putty kit and related methods whereby a user may achieve a stiffness that was previously commercially unavailable in therapeutic or strength-building putties. It is even further desired to enable a user to select a resistance-modifiable putty based on visual and aesthetic criteria knowing that modifying the stiffness of the product will not alter the total weight, color, appearance, release or other characteristics of the primary mass.

BRIEF SUMMARY OF THE INVENTION

In accordance with the present invention, a method of exercise or manipulative therapy is disclosed. The method includes the steps of obtaining a first mass of putty, introducing an additive into the first mass and physically manipulating the first mass with the additive to create a combined mass. The combined mass exhibits a noticeable change in stiffness relative to the first mass, yet the combined mass retains substantially the same weight and color of the first mass. Exercise or manipulative therapy is achievable by physically manipulating the combined mass.

Additionally disclosed is a kit for providing manipulative therapy of varying difficulty to a user. The kit includes a first mass of putty and an additive, which is initially separate from the first mass. If through physical manipulation the additive is combined with the first mass, a combined mass is created. The combined mass exhibits a noticeable change in stiffness relative to the first mass, yet retains substantially the same weight and color of the first mass.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

1. Primary Mass Material

Figure 1:
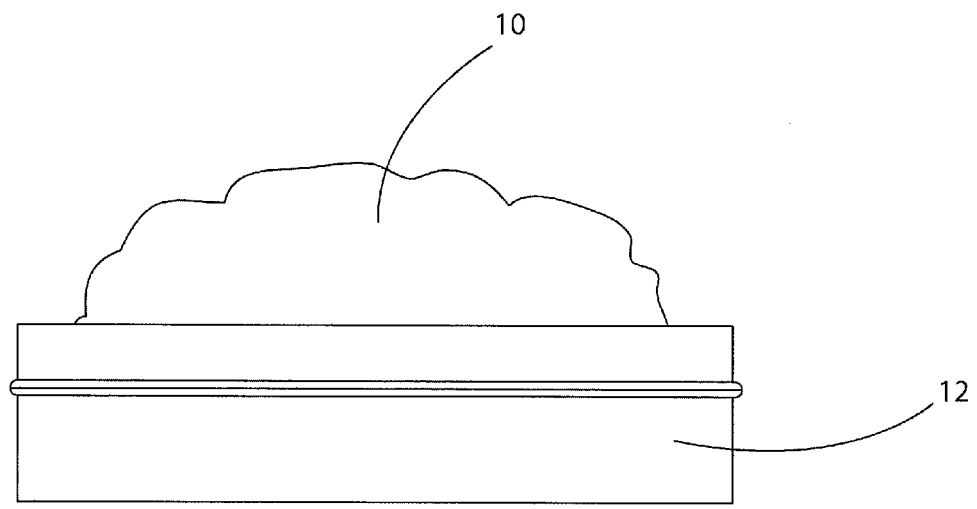
FIG. 1 is an isometric view of certain components of an exercise putty kit for increasing or decreasing therapeutic resistance.
Figure 1:
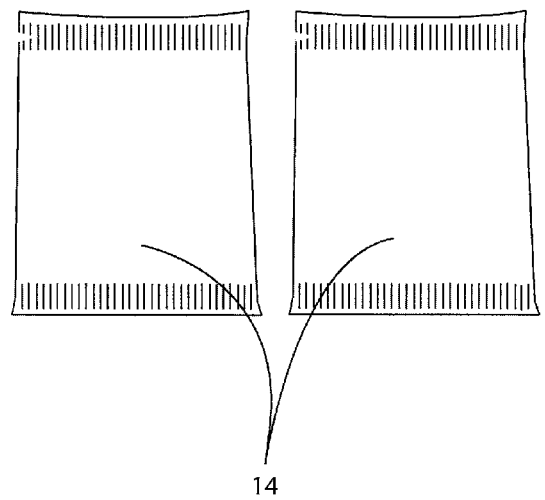

Numerous malleable materials may be used as the basis for exercise putties according to the invention including natural earth clays, heat-curable polymers, and organic polymer clays. However, siloxanes and siloxane reaction products are preferred because they will not dry out as water-based compositions have a tendency to do. Nor do they have a strong offensive odor or release excessive amounts of base oil onto the skin after manipulation.

A particularly preferred composition for the primary mass or main exercise putty mass according to the present invention includes (a) a chain-extended polysiloxane reaction product, (b) optionally a second, normal uncured polysiloxane gum, (c) an internal lubricant such as a monounsaturated fatty acid, (d) flow control agents, (e) any of a number of filler materials, and (e) pigmentation. The plasticity of such a main mass composition preferably ranges from 70 to $90 \times 10^{-2}$ mm of deformation as measured on a Williams plastometer.

The above recited chain-extended polysiloxane reaction product may be formed by reacting a polydiorganosiloxane with a reactant containing oxygen and either boron or tin. Reactants including trimethyl boroxane, pyroboric acid, esters of boric acid, or other boron/oxygen containing compounds are sufficient. Where boron is selected as the chain-extending atom, trimethyl boroxine is a preferred reactant. If a tin and oxygen based compound is desired, dibutyldiacetoxytin may be used.

This boron or tin based reactant is reacted with a polydiorganosiloxane, preferably hydroxyl end terminated polydimethylsiloxane fluid with a viscosity of 20 to 125,000 centistokes, more preferably having a viscosity of 50 to 75,000 centistokes, an average molecular weight of 3000 to 100,000, and an average number of siloxyl units per molecule between 50 and 1,500. The boron or tin reactant attacks the hydroxyl terminated end groups on the polysiloxane changes to yield transient chain extension through the boron or tin groups. Because boron is trifunctional, the boron atom will link three polysiloxane chain ends together fifty to one hundred percent of the time. In a preferred reaction, approximately 100 parts by weight of polydimethylsiloxane are reacted with 3 parts by weight of trimethyl boroxane. This reaction is carried out at approximately 200° F. to produce the final reaction product.

This reaction product is further modified to include an uncured polysiloxane gum on the order of 1 million centistokes and a plasticity between 120 and $140 \times 10^{-2}$ mm as measured on a Williams plastometer. While this gum may be any common polydiorganosiloxane gum, a preferred gum is polydimethylsiloxane. Because it is not cured and little or no siloxyl crosslinking will occur, the percentage of side group substitutions can generally be ignored. Thus, a methyl vinyl polysiloxane can as easily be used. This uncured polysiloxane may be trimethyl end-blocked, dimethyl vinyl end-blocked, or end blocked with other groups known in the art. The second uncured polysiloxane acts as a plasticizer to prevent the composition from becoming tacky after extensive kneading, and may be present in the composition in the range of 10 to 50 parts by weight inclusive relative to 100 parts by weight of the chain-extended polysiloxane reaction product.

Further, exercise putty which is based on nothing except borosiloxane exhibits slump or self-leveling and has a tendency to pool over the course of minutes to hours depending on ambient temperature. This material cannot be left for long on carpeting or macroscopically porous surfaces as it will infiltrate the cracks and holes. Adding the second polysiloxane has the additional effect of providing some body or resistance to slump, such that the resulting mass will be more shape-retaining or clay-like and less fluid-like.

The primary mass also preferably includes an internal lubricant such as 9-octadecenoic acid, sold commercially under various brand names. Alternatively, other monounsaturated fatty acids such as those of $C_{17}$-$C_{18}$ carbon chain length can be used. A monounsaturated fatty acid is added to affect the flow properties of the two blended polymers described above and may be present in the end composition at 0.2-2.0 parts by weight per 100 parts of the chain-extended polysiloxane reaction product. The monounsaturated fatty acid may be added after reaction to further adjust the plasticity of each batch and ensure consistency between batches.

Another principal constituent of the main mass is a filler such as a siliceous or calcareous material. Particular fillers useful for the invention include reinforcing fillers such as fumed silica, ground silica, precipitated silica, calcium carbonate, and nonreinforcing fillers such as celite and ground quartz, and other fillers commonly known in the industry. The filler materials selected should not be so highly colored as to affect the ability of pigments to obtain a desired color of the putty mass during the later stages of the production process. The filler material can be present in the composition from 5 to 65 parts by weight relative to 100 parts of the reaction product.

In certain applications, e.g., exercise or therapy, it may be further desired to heat the putty mass prior to giving it to the user. Certain filler materials will preferentially absorb microwave radiation generated by common kitchen microwaves. Filler materials which are complexes containing bound water, such as hydrated silicas, display this characteristic. Representative of such compounds and complexes is precipitated or ground silica, which is also preferred because of its reinforcing capabilities. Precipitated silica has hydrated onto its surface a layer of water molecules. The water molecules themselves have OH bonds which absorb microwave energy; the silica particles are heated upon exposure to this energy. Hydrated silicates and other compounds containing bound water are preferred over other water-containing mixtures because bound-water particulate materials will heat up each time after successive exposures to microwave energy. Precipitated silica acquires its boundary layers of water by the process of its manufacture.

Other lubricants may be added to the composition in addition to, and not in place of, the monounsaturated fatty acid. One of these additional additives is petrolatum, which has the particular effect of imparting an anti-sticking property to the composition. Petrolatum may be present in the composition in an amount in the range of 0 to 30 parts by weight relative to 100 parts by weight of the boro- or stannosiloxane reaction product. Glycerine may also be added in the range of 0 to 1 part by weight order to impart a shiny surface to the mass.

In order to form a particularly preferred composition, 100 parts by weight of a hydroxyl end-stopped polydimethylsiloxane having a viscosity of 70,000 centistokes is reacted with 3 parts by weight of trimethoxyboroxine at 200° F. until a "snow" of polymerized borosiloxane reaction product results. 100 parts of this reaction product is combined with 30 parts of uncured polydimethylsiloxane gum, having a plasticity of $130 \times 10^{-2}$ mm, 1 part 9-octadecenyl acid, and 20 parts precipitated silica.

2. Softening Agent

The softening agent preferably comprises an internal lubricant such as 9-octadecenoic acid. Other monounsaturated fatty acids such as those of $C_{17}$-$C_{18}$ carbon chain length can be used. The monounsaturated fatty acid is added to affect the flow properties of the primary mass described above and may be added to the end composition at 0.05-5.0 parts by weight per 100 parts of the chain-extended polysiloxane reaction product.

The principle ingredient of the softening agent exists alone as a messy, oily liquid. Thus the softening agent should include a filler so that the resulting compound is a non-messy, useful paste for application by the user. The filler may be a reinforcing filler such as fumed silica or precipitated silica, or alternatively a nonreinforcing filler, such as celite or ground quartz. Other fillers commonly known in the industry may also be used. The filler materials selected should not be so highly colored as to affect the desired color of the primary putty mass in question. Also, the fillers should absorb as much of the lubricant as possible such that the total mass is primarily lubricant and as little of the mass as possible is filler. The filler material can be present in the compound from 5 to 30 parts by weight relative to 100 parts of the softener product.

The end compound, i.e. the softening agent, should be a thick, non-sticky paste which is not messy and can easily be worked into the primary mass in a consumer friendly environment such as a desk, kitchen table, hand, or lap. This compound should not have an undesirable odor, it should offer some protection to the constituent fatty acid from atmospheric oxidation, it should not stick to the skin, should be easily removed from clothing or furniture in case of accidental spills and should have a shelf life of at least two years when placed in an air-tight container, and at least one week when left in open air.

3. Hardening Agent

The hardening agent preferably comprises a hydroxide such as zinc hydroxide. Other hydroxides such as magnesium hydroxide or clays, such as hectorite and bentonite can be used. The hydroxide is added to alter the relative proportions of hydrophilic and hydrophobic components of the mass and thus control the elasticity, plasticity, or stiffness of the primary mass described above and may be added to the end composition at 0.05-5.0 parts by weight per 100 parts of the chain-extended polysiloxane reaction product.

Because the hardening agent exists as a fine, dry powder, it requires a liquid compounding agent to bind it into a non-messy, useful paste for application by the user. The liquid compounding agent may be in the form of a liquid or semi-liquid such as a silicone-based polydiorganosiloxane gum or fluid, or hydrocarbon-based mineral oil or petrolatum. The viscocity of the liquid compounding agent should be between 10,000 and 1.5 million centistokes. The liquid compounding agent selected should not be so highly colored as to affect the desired color of the primary putty mass in question. Also, the liquid compounding agent should absorb as much of the hardener as possible such that the total mass is primarily hardener and as little of the mass as possible is liquid compounding agent. The end compound should yield a thick, non-sticky paste which is non-messy and can easily be worked into the primary mass in a consumer friendly environment such as a desk, kitchen table, hand, or lap. This paste should not have an undesirable odor, should not stick to the skin, should be easily removed from clothing or furniture in case of accidental spills and should have a shelf-life of at least two years when placed in an air-tight container and at least one week when left in open air. The filler material can be present in the composition from 5 to 60 parts by weight relative to 100 parts of the hardener product.

Preferably, none of the softening or hardening agents dissolve any water-insoluble pigments which may be present in the primary mass of putty. If such pigments are dissolved within them, they will allow these pigments to migrate onto the user's hands. If, on the other hand, the pigment particles are "wetted-out" by any of the constituents of the secondary or tertiary masses, the pigmentation will remain in the primary mass and will not migrate onto the user's hands.

4. Operation of the Present Invention

In one embodiment of the present invention, as illustrated in FIG. 1, a kit is provided including a container 12 of a primary mass of borosiloxane putty 10, and at least two packets 14 of additive, whereby one packet 14 contains softening agent and the other packet 14 contains hardening agent. Each packet 14 contains an amount of additive approximately 0.05% to 5%, and not more than 10%, of the total weight of the primary mass 10. In an alternative embodiment (not shown), the various components of the kit illustrated in FIG. 1 may be provided separately to the user. The primary mass 10 may optionally come in a variety of different, aesthetically pleasing colors.

Figure 2A:
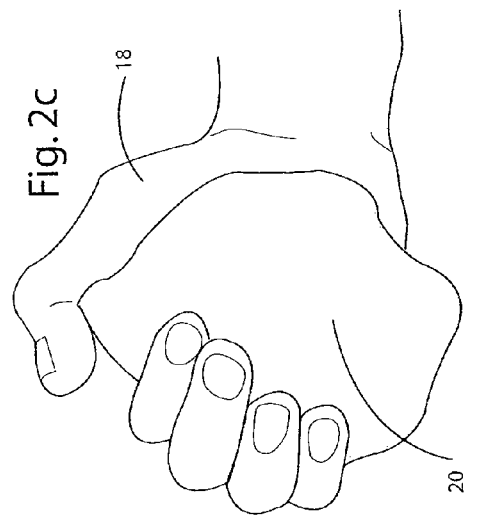
FIGS. 2a-2c are isometric views demonstrating the process by which putty is hardened or softened by combining the kit ingredients and thoroughly mixing via manipulation by hand.
Figure 2B:
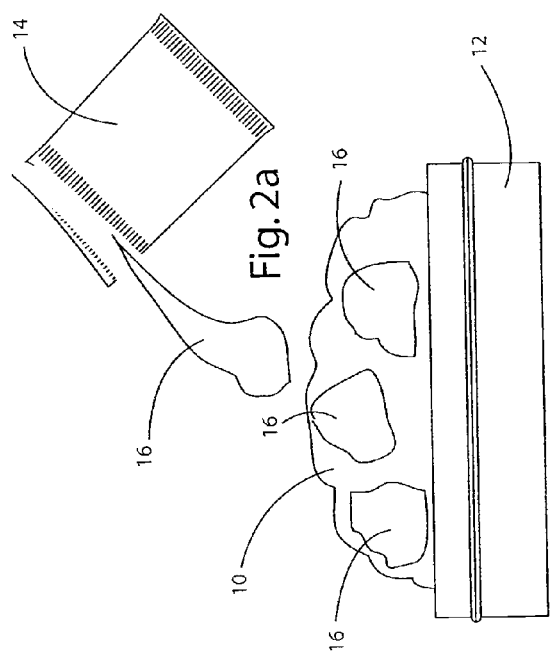
Figure 2C:
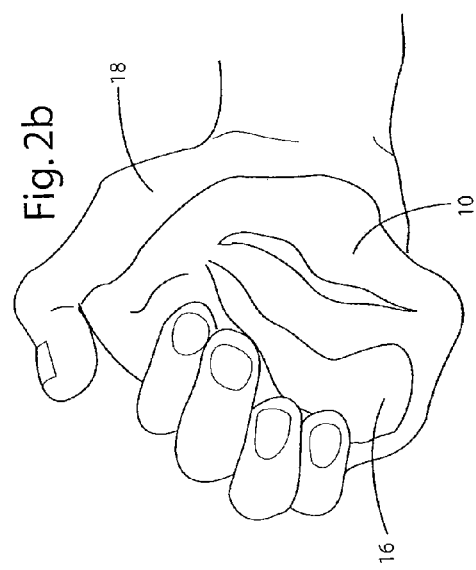

Referring now to FIGS. 2a-2c, the process by which a user may increase or decrease the stiffness of the primary mass 10 is shown. "Stiffness," as used herein, denotes the measure of resistance a malleable material (e.g. putty), has to physical manipulation. The greater the stiffness of a material, the greater resistance it has to physical manipulation. Stiffness is inversely related to plasticity. Thus, as the stiffness of a material increases, its plasticity decreases. Conversely, as the stiffness of a material decreases, its plasticity increases.

FIG. 2a shows a container 12 holding a primary mass 10, into which an additive 16 from a packet 14 is introduced. The additive 16 is uncolored and preferably appears whitish, slightly translucent, or off-white, so that it would have as little impact on the pigmentation of the primary mass 10 as possible. Notice that the primary mass 14 is visibly distinguishable from the additive 16 in FIG. 2a.

Next, as illustrated in FIG. 2b, using his hand 18, the user picks up the primary mass 10 into which the additive 16 had been introduced. The user then begins to manipulate the primary mass 10 with his hand 18. Manipulation may come in the form of squeezing, folding, stretching, or mashing, for example. At first, the primary mass 10 is visually distinguishable from the additive 16, as shown in FIG. 2b. However, after further manipulation, the additive 16 combines with the primary mass 10 to form one combined mass 20, as illustrated in FIG. 2c.

The combined mass 20 is a homogenous mixture comprising the primary mass 10 and the additive 16. If the additive 16 is a softening agent, the combined mass will be noticeably less stiff than the original primary mass 10. Alternatively, if the additive 16 is a hardening agent, the combined mass will be noticeably stiffer than the original primary mass 10. A noticeable change in stiffness is one which is perceivable by an ordinary person without the assistance of an instrument or measuring device. In either case, however, the total weight, color, appearance, release or other characteristics of the combined mass 20 remains substantially the same as the primary mass 10. In this context, "substantially the same," means that any difference is not perceivable by an ordinary person without the assistance of an instrument or measuring device.

Once a combined mass 20 is formed, the user can use his hand 18 to perform exercise or manipulative therapy with the combined mass 20 at the desired level of stiffness. If at any point in time, the user decides to further adjust the stiffness of the combined mass 20, the user may introduce additional additive 16 to the combined mass 20 and proceed to manipulate the mass 20, as discussed above, and as illustrated in FIGS. 2b and 2c. If the additive 16 is a softening agent, the combined mass 20 will noticeably reduce in stiffness, yet remain otherwise substantially the same. Alternatively, if the additive 16 is a hardening agent, the combined mass 20 will noticeably increase in stiffness, yet remain otherwise substantially the same. A user may continue to introduce additive 16 to achieve the desired stiffness, without substantially altering other properties of the combined mass 20.

Still referring to FIGS. 2a-2c, the stiffness of a primary or combined mass 10,20 decreases gradually as packets 14 of additive 16 in the form of a softening agent are introduced from a starting point of the primary mass 10 or existing combined mass 20, toward an endpoint when the user no longer has packets 14 of softening agent. So long as packets 14 of uniform-volume softening agent are introduced to the combined mass 20, the stiffness of the combined mass 20 decreases in a linear fashion. The linear decrease in stiffness of the combined mass 20 is indicative of the decreasing difficulty of putty exercises or therapeutic manipulation. In one embodiment, each packet 14 of softening agent is calculated to decrease the stiffness by ten to fifteen$\times 10^{-2}$ mm as measured on a Williams plastometer. Pre-measured, uniform-volume packets 14 of softening agent would be especially helpful to an inexperienced user. As an alternative to pre-measured, uniform-volume packets 14, the user may be provided with a bulk quantity of softening agent (not shown). This alternative may be more desirable to an experienced user or therapist, who may be better able to gauge the amount of softening agent needed to attain the desired stiffness.

The stiffness of a primary or combined mass 10,20 increases gradually as packets 14 of additive 16 in the form of a hardening agent are introduced from a starting point of the primary mass 10 or existing combined mass 20, toward an endpoint when the user no longer has packets 14 of hardening agent. So long as packets 14 of uniform-volume hardening agent are introduced to the combined mass 20, the stiffness of the combined mass 20 increases in a linear fashion. The linear increase in stiffness of the combined mass 20 is indicative of the increasing difficulty of putty exercises or therapeutic manipulation. In one embodiment, each packet 14 of hardening agent is calculated to increase the stiffness by ten to fifteen$\times 10^{-2}$ mm as measured on a Williams plastometer. Pre-measured, uniform-volume packets 14 of hardening agent would be especially helpful to an inexperienced user. As an alternative to pre-measured, uniform volume packets 14, the user may be provided with a bulk quantity of hardening agent (not shown). This alternative may be more desirable to an experienced user or therapist, who may be better able to gauge the amount of hardening agent needed to attain the desired stiffness.

Although some effects of the hardening agent are felt immediately, the combined mass 20 will generally not achieve its final level of stiffness until approximately twelve hours after the hardening agent was introduced. This time can be decreased by means of heat and/or extensive physical manipulation, both of which accelerate the integration of the hardening agent into the combined mass 20. Thus, a user may wish to perform exercises with the combined mass 20 after introducing hardening agent, since it would accelerate the time for complete integration.

The present invention may come in various alternative embodiments and may serve a variety of different purposes. Still referring to FIGS. 2a-2c, assume, for example, that the user wants to use the primary or combined mass 10,20 outdoors, in a car, or another area without climate control. Because ambient temperature affects the plasticity of the mass 10,20, it may become too stiff if the seasonal ambient temperature is well below room temperature. Conversely, the mass 10,20 may lose its desired stiffness if the seasonal ambient temperature is well above room temperature. In either scenario, the user may introduce the appropriate additive 16 to the mass 10,20 in order to attain the desired stiffness of the combined mass 20 in the seasonal ambient temperature.

In another example the user may like to heat the primary or combined mass 10,20 for aesthetic or therapeutic reasons, but finds that it loses its desired stiffness at a higher temperature. In such a case, the user may add hardening agent to the mass 10,20 until the desired level of stiffness at the higher temperature is achieved. Alternatively, the user may like to cool the primary or combined mass 10,20 for aesthetic or therapeutic reasons, but finds that it becomes too stiff at a lower temperature. In such a case, the user may add softening agent to the mass 10,20 until the desired level of stiffness at the lower temperature is achieved.

In yet another example, the user may manipulate the primary or resultant mass for the purpose of increasing the strength of hand muscles. For this purpose, the user has been progressively adding hardening agent, first to the primary mass 10 and subsequently to the combined mass 20, in order to increase resistance over the course of an exercise regimen. If the user stops the exercise regimen and does not restart until some time later, or if the user suffers a hand injury, the hand muscles may revert back to a weaker state. The present invention allows the user to add softening agent to the combined mass 20 in order to reduce the stiffness of the mass 20. In this way, the newly formed combined mass 20 will accommodate the hand 18 in its weakened state. As hand strength again increases, the user may accordingly increase the stiffness of the combined mass 20 by means of additional hardening agent.

In still another instance, the primary or combined mass 10,20 may become too soft because through extensive long-term usage, hand oils and other contaminants have infiltrated the primary or combined mass 10,20 and acted as internal lubricants making the mass 10,20 soft and sticky. If this happens, the user may add hardening agent to the mass 10,20 in order to regain its desirable properties.

The invention will be illustrated in further detail with reference to the following Examples of actual experiments conducted. However, it should be understood that the present invention is not deemed to be limited to the following Examples.

EXAMPLES

The stiffness of the combined mass was measured in terms of plasticity on a Williams' plastometer. The test method used is described in ASTM D926-89, which is fully incorporated by reference herein. A standard sample size of 2.12 grams was used. The value recorded was the thickness of the material after it had been depressed under a load for three minutes. The lower the value for plasticity, the stiffer the material.

The following compositions were prepared for the experiments:

| Primary Mass | |
| --- | --- |
| Dimethyl siloxane reaction product | 75 parts |
| Amorphous silica | 10 parts |
| Polydimethylsiloxane gum | 5 parts |
| Glycerine | 5 parts |
| Dimethylcyclosiloxane | 5 parts |
| Softening Agent | |
| 9-octadecanoic acid | 84 parts |
| Amorphous silica | 16 parts |
| Hardening Agent | |
| Zinc Hydroxide | 50 parts |
| Polydimethylsiloxane gum | 50 parts |

Experiment 1

The primary mass had a weight of 90 grams into which were added small 0.25 gram quantities of softening agent.

| | Plasticity ($\times 10^{-2}$ mm) |
| --- | --- |
| Initial primary putty mass (a): | 142 |
| Softening agent (b): | N/A |
| After first addition of 0.25 g. of (b): | 127 |
| After second addition of 0.25 g. of (b): | 111 |
| After third addition of 0.25 g. of (b): | 102 |
| After fourth addition of 0.25 g. of (b): | 95 |

The data show that each time additional softening agent was added, the stiffness of the large mass decreased, and thus, exercise therapy using the combined mass became less difficult.

Experiment 2

A new primary mass had a weight of 90 grams into which were added small 0.25 gram quantities of hardening agent.

| | Plasticity ($\times 10^{-2}$ mm) |
| --- | --- |
| Initial primary putty mass (a): | 142 |
| Hardening agent (b): | N/A |
| After first addition of 0.25 g. of (b): | 160 |
| After second addition of 0.25 g. of (b): | 170 |
| After third addition of 0.25 g. of (b): | 183 |
| After fourth addition of 0.25 g. of (b): | 196 |

The data show that each time more hardening agent was added, the stiffness of the large mass increased, and thus, exercise therapy using the combined mass became more difficult.

Experiment 3

The combined mass resulting from Experiment 1 was used. It had a weight of 91 grams into which were added small 0.25 g quantities of hardening agent.

| | Plasticity ($\times 10^{-2}$ mm) |
| --- | --- |
| Initial primary putty mass (a): | 95 |
| Hardening agent (b): | N/A |
| After first addition of 0.25 g. of (b): | 99 |
| After second addition of 0.25 g. of (b): | 112 |
| After third addition of 0.25 g. of (b): | 120 |
| After fourth addition of 0.25 g. of (b): | 128 |

The data show that even after a number of applications of softening agent were added to the primary mass, the addition of hardening agent raised the stiffness back to the starting point and beyond, and thus physical manipulation of the combined mass became more difficult.

Experiment 4

The combined mass resulting from Experiment 2 was used. It had a weight of 91 grams into which were added small 0.25 g quantities of softening agent.

| | Plasticity ($\times 10^{-2}$ mm) |
| --- | --- |
| Initial primary putty mass (a): | 196 |
| Softening agent (b): | N/A |
| After first addition of 0.25 g. of (b): | 180 |
| After second addition of 0.25 g. of (b): | 162 |
| After third addition of 0.25 g. of (b): | 150 |
| After fourth addition of 0.25 g. of (b): | 145 |

The data show that even after a number of applications of hardening agent had been added to the primary mass, the addition of softening agent decreased the stiffness back to the starting point and beyond, and thus physical manipulation of the combined mass became less difficult.

Experiment 5

The combined mass from Experiment 4 was used. It had in a final weight of 92 grams into which were added small 0.25 g quantities of hardening agent.

| | Plasticity ($\times 10^{-2}$ mm) |
| --- | --- |
| Initial primary putty mass (a): | 145 |
| Hardening agent (b): | N/A |
| After first addition of 0.25 g. of (b): | 148 |
| After second addition of 0.25 g. of (b): | 156 |
| After third addition of 0.25 g. of (b): | 169 |
| After fourth addition of 0.25 g. of (b): | 176 |

The data show that even after a number of applications of softening and hardening agents had been added to the primary mass, further applications of hardening agent increased the stiffness back to the starting point and beyond, and thus, physical manipulation of the combined mass became more difficult.

The total weight of the combined mass at the conclusion of Experiment 5 was within 4% of the primary mass even after three rounds of extensive modification of the plasticity over twelve discrete plasticity points. The texture, release, and color of the resultant mass were not negatively affected by the process and the resultant mass could endure even further modification by the user.

While the invention has been described in detail and with reference to specific examples thereof, it will be apparent to one skilled in the art that various changes and modifications can be made therein without departing from the spirit and scope thereof.

What is claimed is:

1. A method of exercise or manipulative therapy comprising the steps of:
   a. obtaining a mass of putty comprising a reaction product of a polysiloxane and either a boron- or tin-containing compound, said mass of putty having a first stiffness;
   b. introducing to said mass of putty a hardening paste comprising a hydroxide selected from the group consisting of zinc hydroxide, magnesium hydroxide and combinations thereof, said hardening paste having a stiffness that is less than said first stiffness;
   c. physically manipulating said mass of putty with said hardening paste to create a combined mass having a stiffness that exceeds said first stiffness; and
   d. physically manipulating said combined mass, thereby accomplishing said exercise or manipulative therapy.

2. The method of claim 1 wherein said stiffness of said combined mass is achieved through interaction of said hydroxide with said mass of putty, said interaction causing an alteration of relative proportions of hydrophilic and hydrophobic components of said mass of putty.

3. The method of claim 2 wherein a time lapse exists between formation of said combined mass and fully achieving the maximum potential degree of stiffness possible with the amount of hardening paste present in said combined mass, said time lapse being dependent on the rate of said alteration of relative proportions of hydrophilic and hydrophobic components of said mass of putty.

4. The method of claim 1 wherein said stiffness of said combined mass exceeds said first stiffness by $3\text{-}7\times10^{-2}$ mm as measured on a Williams plastometer, when said hardening paste is 0.1% of the weight of said mass of putty.

5. An exercise putty kit for providing manipulative therapy of varying difficulty to a user, comprising:
   a. a mass of putty comprising a reaction product of a polysiloxane and either a boron- or tin-containing compound, said mass of putty having a first stiffness;
   b. a packet of softening paste comprising a compound selected from the group consisting of 9-octadecenoic acid, $C_{17}$ monounsaturated fatty acid, $C_{18}$ monounsaturated fatty acid and combinations thereof; and
   c. a packet of hardening paste comprising a compound selected from the group consisting of zinc hydroxide, magnesium hydroxide and combinations thereof, said hardening paste having a stiffness that is less than said first stiffness.

6. The kit of claim 5, said softening paste further comprising a filler, said hardening paste further comprising a liquid compounding agent.

7. The kit of claim 6, wherein said filler is selected from the group consisting of famed silica, precipitated cilica, celite, ground quartz and combinations thereof.

8. The kit of claim 6, wherein said liquid compounding agent is selected from the group consisting of silicone-based polydiorganosiloxane gum, silicone-based polydiorganosiloxane fluid, hydrocarbon-based mineral oil, petrolatum and combinations thereof.

9. The kit of claim 5, wherein said packet of softening paste contains an amount of softening paste between 0.05% to 5% of the total weight of said mass of putty.

10. The kit of claim 5, wherein said packet of hardening paste contains an amount of hardening paste between 0.05% to 5% of the total weight of said mass of putty.

11. A method of exercise or manipulative therapy comprising the steps of:
    a. obtaining a mass of putty containing a reaction product of a polysiloxane and either a boron- or tin-containing compound;
    b. introducing a stiffness-adjusting paste to said mass of putty, said stiffness-adjusting paste having a lesser stiffness than said mass of putty;
    c. physically manipulating said mass of putty with said stiffness-adjusting paste to create a combined mass which exhibits a change in stiffness relative to said mass of putty of between $3\text{-}7\times10^{-2}$ mm as measured on a Williams plastometer, when said stiffness-adjusting paste is 0.1% of the weight of said mass of putty; and
    d. physically manipulating said combined mass, thereby accomplishing said exercise or manipulative therapy.

12. The method of exercise or manipulative therapy of claim 11, said stiffness-adjusting paste being a hardening agent comprising a metal hydroxide salt and a liquid compounding agent.

13. The method of exercise or manipulative therapy of claim 12, said metal hydroxide salt being selected from the group consisting of zinc hydroxide, magnesium hydroxide and combinations thereof, said liquid compounding agent being selected from the group consisting of silicone-based polydiorganosiloxane gum, silicone-based polydiorganosiloxane fluid, hydrocarbon-based mineral oil, petrolatum and combinations thereof.

14. The method of exercise or manipulative therapy of claim 11, said stiffness-adjusting paste being a softening agent comprising a filler and a compound selected from the group consisting of 9-octadecenoic acid, $C_{17}$ monounsaturated fatty acid, $C_{18}$ monounsaturated fatty acid and combinations thereof.

15. The method of exercise or manipulative therapy of claim 14, said filler being selected from the group consisting of fumed silica, precipitated cilica, celite, ground quartz and combinations thereof.

* * * * *